J. WILLIAMSON.
AQUARIUM.
APPLICATION FILED JULY 12, 1915.
1,169,449.
Patented Jan. 25, 1916.
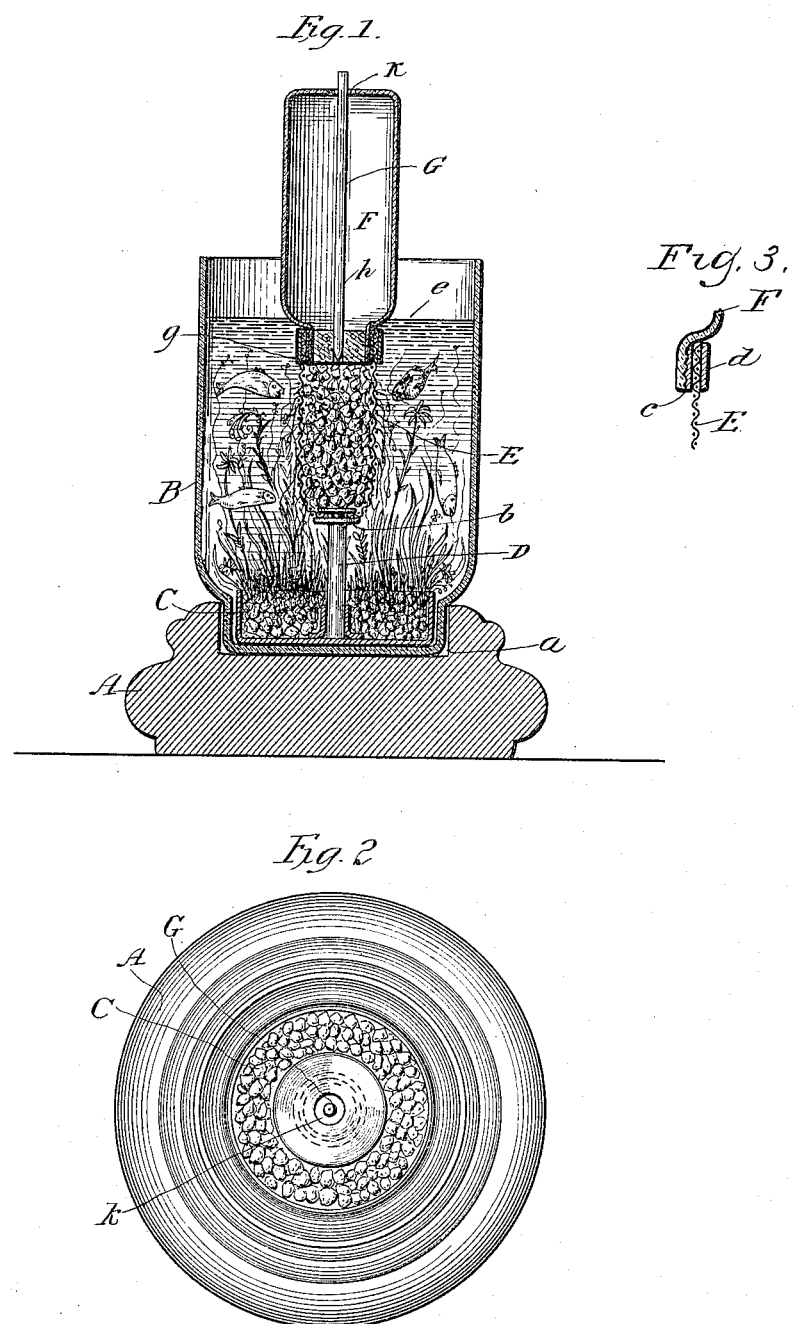
Witnesses:
Florence Mitchell
Inventor:
Jacob Williamson
by Frank D. Thomason
Atty.
THE COLUMBIA PLANOGRAPH CO., WASHINGTON, D. C.

UNITED STATES PATENT OFFICE.

JACOB WILLIAMSON, OF CHICAGO, ILLINOIS.

AQUARIUM.

1,169,449.      Specification of Letters Patent.      Patented Jan. 25, 1916.

Application filed July 12, 1915. Serial No. 39,273.

*To all whom it may concern:*

Be it known that I, JACOB WILLIAMSON, a citizen of the United States, residing at Chicago, in the county of Cook and State of Illinois, have invented new and useful Improvements in Aquariums, of which the following is a full, clear, and exact description.

My invention relates to aquariums, and particularly to aquariums having means for receiving pebbles and other mineral and vegetable matter which it is customary to place in the same.

The object of my invention is to so construct the parts of such an aquarium that the mineral and vegetable matter therein can be removed and cleansed whenever desired without removing the water or disturbing the fish, and to slowly supply fresh water to the same so as to maintain the level and the purity of the water without changing the temperature thereof suddenly and endangering the health of the fish. This I accomplish by the means hereinafter fully described, and as particularly pointed out in the claims.

In the drawings: Figure 1 is a vertical central section of my improved aquarium. Fig. 2 is a transverse section taken on dotted line 2—2, Fig. 1. Fig. 3 is a detail view.

Referring to the drawings, A represents a suitable base of wood or other material which may be given any design desired, and which has a suitable depressed area or seat $a$ in the top thereof for the reception of the bottom of the aquarium. This aquarium B, while usually made of glass, may be made of any other material desired, and while it is preferred to make the upper part thereof cylindrical, as shown in the drawings, it may be made of the usual globular shape, or any other desired shape, so long as it is more or less open at the top. The bottom of this aquarium is, preferably, less in transverse dimensions than the part above the base, and it is seated in seat $a$ of said base which is made to conform to the shape thereof.

The lower reduced bottom of the aquarium has a tray C seated therein, which, preferably conforms to and fits snugly in said bottom, and has its edges flanged or built upward so as to enable it to retain a sufficient quantity of gravel and sand or such other mineral and vegetable matter as it may be desired to place therein. At about its center this tray C has a post D arising therefrom, the lower end of which is shown to be secured to the bottom of the tray by means of a socket in which it is secured by soldering or riveting, or otherwise. The upper end of this post has a circular plate $b$ secured thereto to which the lower annular edges of a cylindrical woven wire cage E are supported and secured. The upper end of this cage extends very nearly to the surface of the water in the aquarium, and its upper edge portion is, preferably, reinforced by inner and outer rings $c$ and $d$ in any suitable manner; and the inner ring $c$, preferably, being provided with a coarse screw-thread, substantially as shown.

F represents a cylindrical fountain of glass or other material which has its lower end $e$ reduced and closed by a stopper $f$ of cork or other material. The center of this stopper is provided with an axial opening $g$ which is closed by a wooden peg G the lower end of which latter is pointed and the lower portion of which has a groove which extends up from this point beyond the stopper so that water placed in the fountain can only percolate down through the stopper into the water in the aquarium nearly as fast as the small groove $h$ will permit. The upper end of the fountain is, preferably, closed except for a central opening $k$, and I prefer to extend the shaft of peg G up through this opening $k$ so that it may be manipulated by hand to control the supply of water flowing therefrom.

In operation, pebbles or other suitable mineral material are placed in the cage so as to fill it very nearly to the upper end thereof and, if desired, certain aquatic vegetation, substantially as shown in the drawings, may be planted in the cage so that its foliage will branch out into the aquarium, and the lower reduced end of the fountain is screwed to the upper end of the cage and closes the same. The aquarium having been previously filled with water, the fountain is then filled, and the peg is manipulated so as to obtain the proper leakage therefrom to maintain the proper level of water in the aquarium and maintain and keep the same pure without change of temperature. After the tray and the cage have been immersed in the water of the aquarium for a certain length of time they are apt to become more or less dirty.

In this event, the operator can grasp the fountain or the cage and lift the same and the tray out of the aquarium and then cleanse it and replace it without disturbing the fish, which latter are at liberty to swim around the edges of the tray as it is lowered into the water again.

I do not desire to be confined to the exact shape and design of parts nor to the simple form of valve for regulating the seepage of water from the fountain, as hereinbefore illustrated and described, as it is obvious they may be changed without departing from the spirit of my invention.

What I claim as new is:

1. An aquarium comprising a suitable water container, in combination with a tray adapted to contain foreign substances and removably seated in the bottom of said container, a post secured to and arising from said tray, and a fountain having a tubular body extending above the water and supported by said post having a valve controlled lower end.

2. An aquarium comprising a suitable water container, in combination with a tray adapted to contain foreign substances, and removably seated in the bottom of said container, a post secured to and arising from said tray, and a cage supported by said post and made of foraminous material and adapted to contain foreign substances and serve as a medium with which to raise and lower said tray.

3. An aquarium comprising a suitable water container, in combination with a tray adapted to contain foreign substances which is removably seated in the bottom of said container, a post secured to and arising from said tray, a cage supported by said post made of foraminous material, and a tubular fountain the lower end of which is fitted in the upper end of said cage and has a valve controlling the discharge therefrom.

4. An aquarium comprising a suitable water container the transverse dimensions of the bottom of which is reduced, in combination with a tray which is removably seated in said bottom and conforms in shape thereto and has its edges built upward, a vertical post the lower end of which is secured to and which arises from said tray, a woven wire cage mounted upon and secured to said post with the axis of which its axis alines, an inverted bottle-shaped fountain inserted in the upper open end of said cage, and a valve-controlled closure for the lower end of said fountain.

In witness whereof I have hereunto set my hand this 3rd day of July, 1915.

JACOB WILLIAMSON.

Witnesses:
THOMAS TOWNE,
WILLIAM RUNERTSEN.

Copies of this patent may be obtained for five cents each, by addressing the "Commissioner of Patents, Washington, D. C."